United States Patent Office 3,066,465
Patented Dec. 4, 1962

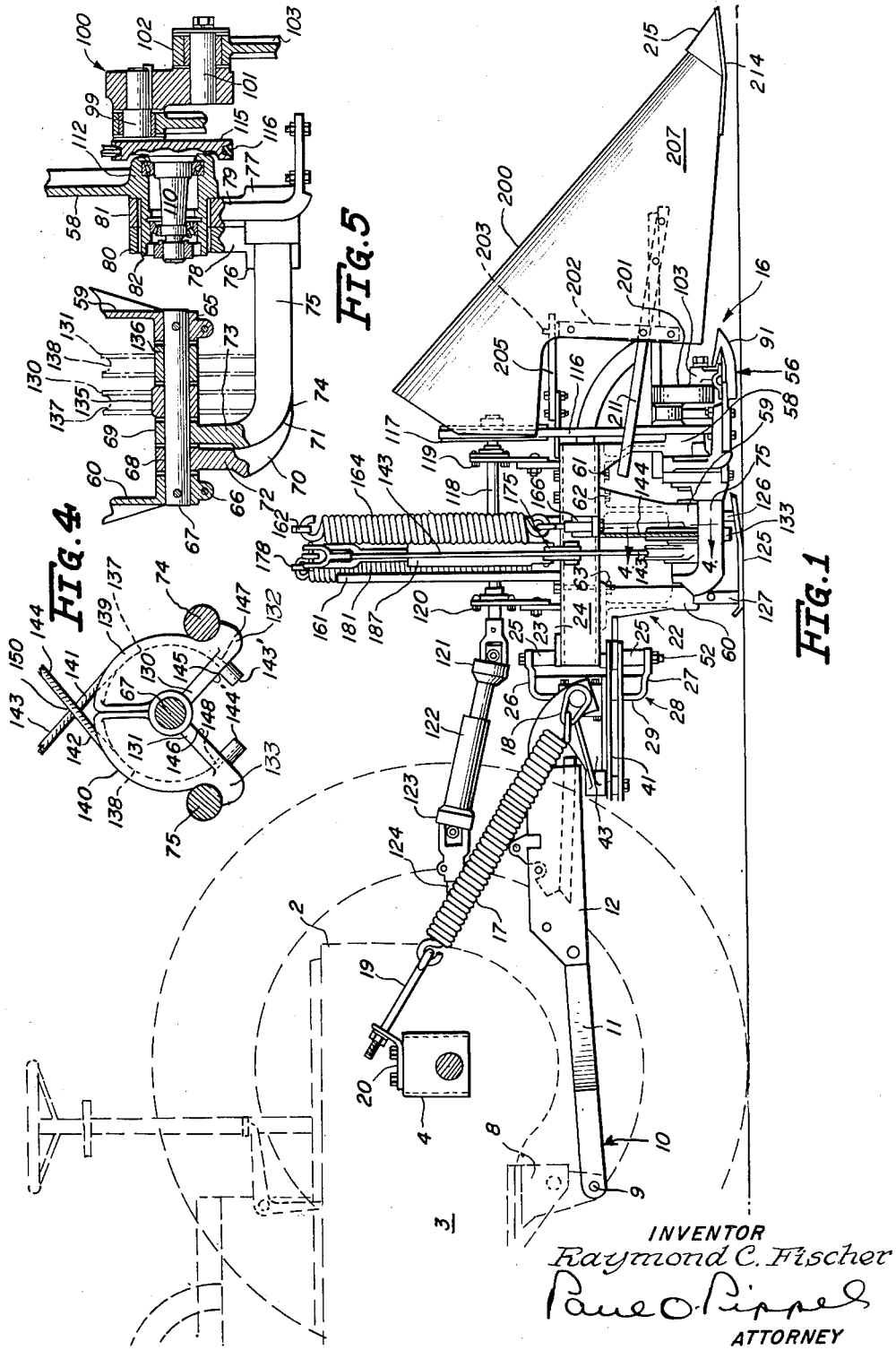

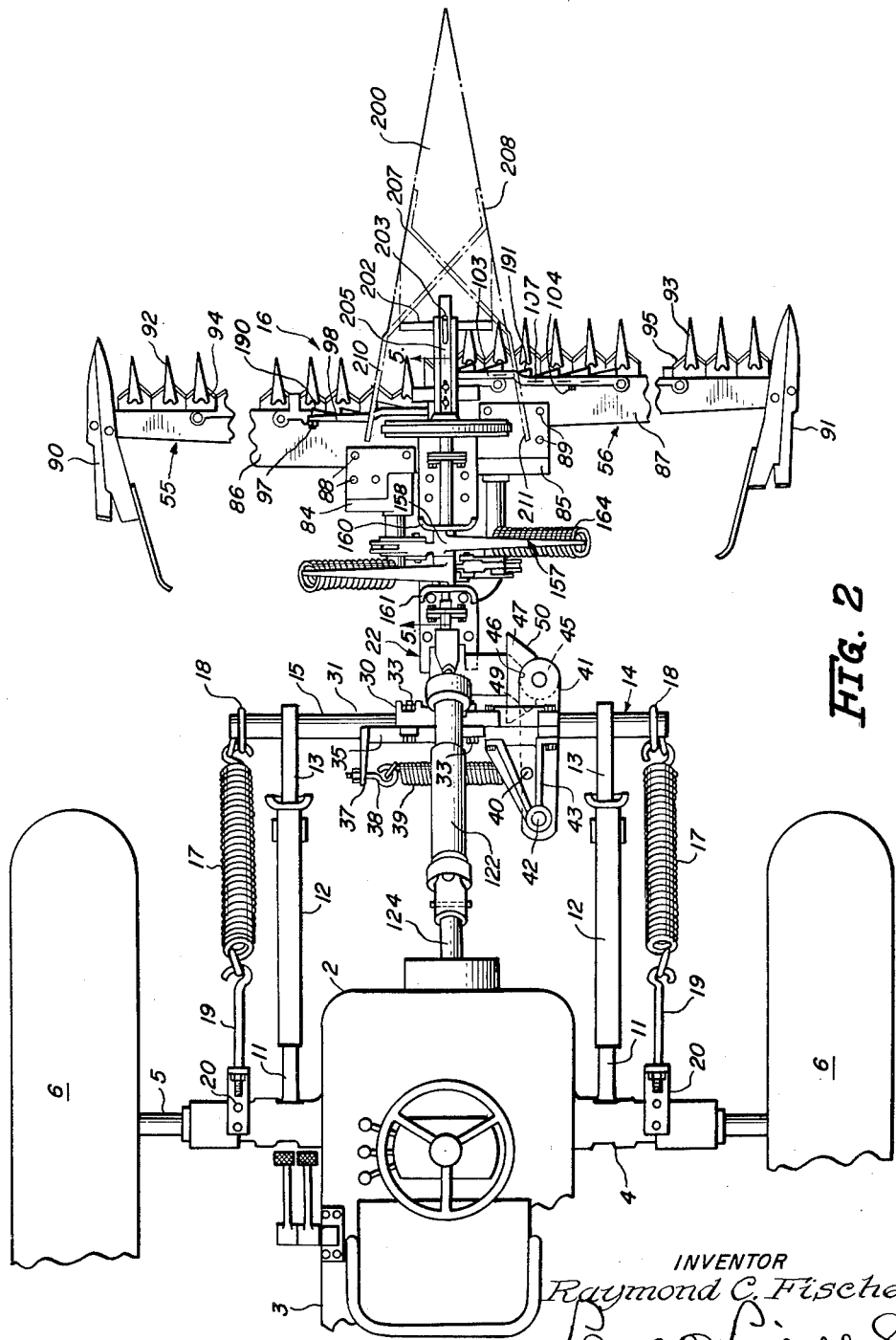

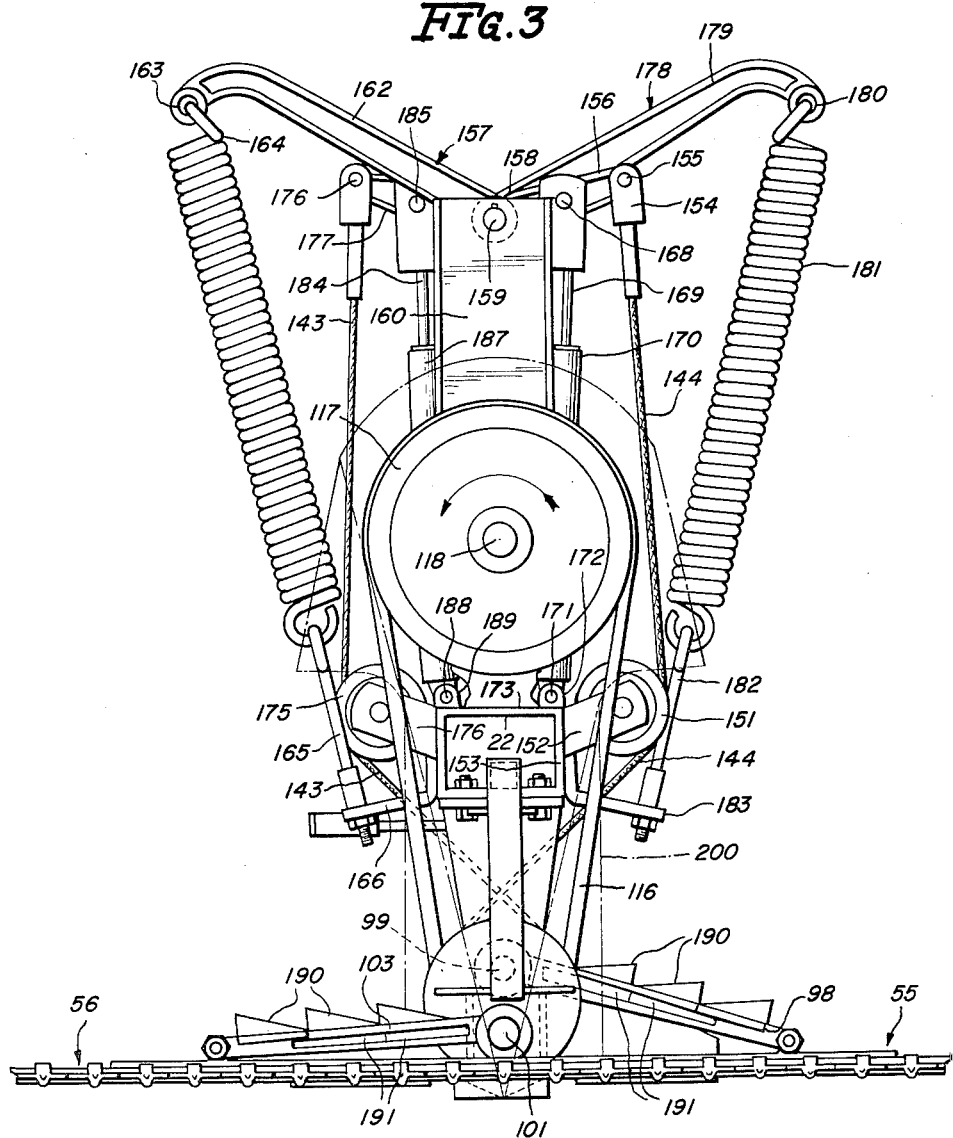

3,066,465
FRONT MOUNTED END TO END ARRANGED DOUBLE MOWER
Raymond C. Fischer, Hinsdale, Ill., assignor to International Harvester Company, Chicago, Ill., a corporation of New Jersey
Filed Aug. 10, 1959, Ser. No. 832,526
3 Claims. (Cl. 56—25)

This invention relates to mowers of the type which precede the motivating vehicle upon which the mower unit is mounted.

The general object of the invention is to provide a novel readily mountable and demountable mower unit comprising a pair of independent mowers which are arranged in end-to-end relationship transversely to the direction of operation and wherein the drive provides a counterbalancing drive relationship between the mowers.

A further object of the invention is to provide in an arrangement such as described in the previous object a novel safety brake back which permits the mower assembly to pivot in either direction that is clockwise or counterclockwise upon the respective left or righ sections of the mower assembly striking an obstruction in order to prevent damage to the mower.

A still further object of the invention is to provide a novel counterbalancing arrangement for the two mower sections about a common center so that each section may be elevated or lowered independently of the other without interrupting the drive to either or both of the sections.

A still further object of the invention is to provide an arrangement for driving the respective mowers which is of compact design which permits the center mounting of the two sections in the center ahead of the motivating or prime mover and wherein the transverse width of the drive connections is minimized so as to obtain a full cut from end to end of the mower assembly.

These and other objects of the invention will become more apparent from the specification and the drawings, wherein:

FIGURE 1 is a side elevational view of the novel mower structure shown mounted on the associated prime mover which is illustrated in phantom lines;

FIGURE 2 is a plan view of the structure shown in FIGURE 1 with parts of the mower broken apart;

FIGURE 3 is an enlarged front view of the mower assembly and drive mechanism and support therefor;

FIGURE 4 is an enlarged transverse vertical sectional view taken substantially on the line 4—4 of FIGURE 1; and FIGURE 5 is an enlarged transverse vertical sectional view taken substantially on the line 5—5 of FIGURE 2.

Describing the invention in detail, there is shown a reverse going tractor generally designated 2 which includes a body portion 3 with a main transverse axle housing 4 from which project the driving axles 5 which drive the wheels 6. The axle housing structure 4 is integrated with the body 3 which has a dependent mounting lug structure 8 on which is pivoted on a substantially horizontal transverse axis as by a pin 9 the forward end of a wishbone shaped drawbar or hitch frame generally indicated 10, the frame 10 including a pair of rearwardly extendnig legs 11 which provide sockets 12 open rearwardly, the sockets preceding the prongs 13 of a drawbar structure generally designated 14, said drawbar structure including an inner connecting cylindrical bar 15 which connects the legs 13 and provides a mounting for the mower generally designated 16. The drawbar and thus the entire hitch assembly as well as the mower are biased upwardly in order to provide a floating action and by means of tension spring 17 each spring being hooked to an eye 18 at an adjacent end of the bar 15 and the spring 17 extending diagonally upwardly toward the axle housing 4 and at their upper ends being adjustably connected as through the eye bolts 19 to brackets 20 which are mounted and secured to the axle housing 4 at opposite sides of the body 3.

The mower support frame 22 comprises a main box section beam 23 which extends in a fore and aft direction, that is longitudinally of the tractor, the rear end 24 of the beam 23 being provided with vertically aligned pintle members 25 which project between the legs 26 and 27 of a receiving yoke generally designated 28, the yoke 28 including an upright bight member 29 which is integrated with a clamp member 30 which engages the forward side 31 of the beam member 15 and is secured thereto by means of bolts 33 which are associated with a rear clamp member 35 which engages the back side of the beam 15. It will be seen that the clamps 30, 35 are clamped about the member 15 and by means of selective adjustment of the bolts 33 the position of the frame and thus the mower and its angle of inclination with respect to the ground may be varied.

The clamp member 35 is provided with a rearwardly projecting or rather tractorwardly projecting lug 37 which serves as an anchor for a hook or an eye 38 which is connected to one tend of a tension spring 39, the other end of the spring being connected by the pin 40 to the arm 41 intermediate the ends of the latter, the arm 41 being pivoted on a substantially vertical axis by means of a pin 42 to a rearwardly projecting bracket 43 which is also formed integral with the clamp member 35 and overlies the member 41. The spring 39 biases the lever 41 so that its outward end which is provided with a roller 45 engages the notch 46 which is provided on the lateral arm or extension 47 connected to the rear end 24 of the main mower frame beam member 23.

As hereinafter explained, the arrangement of the roller 46 and the notched arm 47 with its guiding cam or cam surfaces 49 and 50 provide a break-back for the mower about the bolt 52 which passes through the pintle 25 and the legs 26 and 27 whereby upon the mower striking an obstruction at either side of the axis of pivot of the mower, it will swing back in order to prevent damage to the mower.

A main feature of the present invention is in the provision of two identical mower sections generally designated 55 and 56 and pivotal mounting from a common support structure in the form of a plurality of dependent front, intermediate, and rear pedestal members designated 58, 59, and 60 which are connected respectively by bolts 61, 62 and 63 to the underside of the main beam member 23. The pedestals 59 and 60 are provided adjacent to their lower ends with coaxial bearing supports 65 and 66 which mount fore and aft extending generally horizontal shaft 67 on which are mounted the upper ends 68 and 69 of substantially L-shaped coupling members 70 and 71 which are respectively provided with upwardly and inwardly extending leg portions 72 and 73 which merge at their lower ends into forwardly projecting leg portions 74 and 75.

The leg portions 74 and 75 project at their forward ends into sockets 76 and 77 on the lower ends of swing hangers 78 and 79, the upper ends of which are provided with journals 80 and 81 which pivot about a rearwardly projecting stub axle projection 82 formed integral with the lower end of the forward dependent support 58. Thus each coupling structure 70 and 71 is, in effect, a U-shaped structure and swings at opposite ends about its legs about a common axis which is provided by the shaft 67 and the stub 82. The lower socket members 76 and 77 are integrated with forwardly and laterally projecting mounting plates 84 and 85 which respectively mount and support the mower bars 86 and 87 of the mower structures 55 and 56. The connections of the plates 84 and 85 to the respective mower bar members 86 and 87 comprise bolt and nut assemblies 88 and 89 which are removable.

The outer ends of the mower bars 86 and 87 mount the divider shoes 90 and 91. The bars 86 and 87 are respectively provided with combination guard and ledger plate support members 92 and 93 which respectively mount the sickles 94 and 95, sickle 94 being connected adjacent to its inner end by means of a substantially horizontal pivot 97 to the outer end of a pitman 98, said pitman having its inner end rotatably mounted on a throw 99 of a driving mechanism generally designated 100, said mechanism 100 also including another throw 101 which is spaced 180 degrees from the throw 99 and which mounts the inner end 102 of a pitman 103, the pitman 103 being pivotally connected as by bolt 104 to the sickle 95. It will be noted that the rear end of the double crank 100 comprises a stub shaft 110 which is journalled in the hollow stub axle 82 and a forwardly projecting socket 112 which is coaxial with the socket 82 whereby the drive as well as the pivot of the entire mower assembly including the two sections 55 and 56 is a common fore and aft extending axis. Thus the operation of the mower within certain limits as it is raised vertically to various operating positions is accommodated and at the same time in view of the fact that the two mower sickles are operating in opposition to each other they respectively counterbalance each other and provide a balanced action to reduce the severe vibrations normally present in this type of mower application.

It will be seen that the crank drive is of the cantilever type in that it is only supported at its rear end and that the crank members overhang the support stub axle 110 which at its forward end merges with the driving sheave or pulley 115 which is driven by a belt 116, said belt proceeding upwardly and being trained about the pulley 117 which is connected to the forward end of a drive shaft assembly 118 mounted on brackets 119 and 120 and connected through a universal joint 121 which is vertically aligned with the axis of the brake back which is indicated by the pin 52, the universal joint 121 connecting through a telescoping shaft assembly 122 to a second universal joint 123 which in turn connects to the power take-off shaft 124 of the tractor.

It appears that the drive for the mower as explained by the mechanism is obvious.

In mowers of the type under consideration one of the serious problems resides in minimizing the lateral width of the center connection in addition to pivoting the respective sections upon a common axis. The present invention accomplishes this by elongating the balancing mechanism vertically so as to occupy a minimum width adjacent to the ground which is engaged by the shoe structure 125 connected by the upstanding pedestals 126 and 127 to the members 59 and 60.

Referring now to FIGURE 4, it will be seen that the coupling arms 70 and 71 are connected at their legs 74 and 75 at areas intermediate their ends to the outer ends of lever structures 130 and 131 which are in the form of sectors of annular members, the connection of member 74 to the member 130 being through a saddle 132 formed on the outer lower end of the member 130 and similarly the member 75 seats on the saddle portion 133 at the outer lower end of the member 131. It will be seen that the members 130 and 131 are pivoted by their hub portions 135 and 136 on the shaft 67 and that they provide peripheral grooves 137 and 138 about their arcuate outer contours 139 and 140 for the reception of the lower ends 141 and 142 of the cables 143 and 144, the terminal ends of the cables 143 and 144 being provided with caps 143' and 144' which engage against the undersides 145 and 146 of the members 130 and 131, the terminal ends of the lower ends 141 and 142 of the cables passing through apertures 147 and 148 in said portions 130 and 131. Thus it will be seen that the cables 143 and 144 are capable of being withdrawn and that they ride on the respective peripheries of the members 130 and 131 and that upward actuation of the cables 143 and 144 unwinds the cables from the respective grooves 137 and 138 and that lowering of the units 55 and 56 causes the respective cable ends 141 and 142 to wrap about the peripheral portions 139 and 140 of the respective lever members 130 and 131. It will be seen that the cables 143 and 144 are crossed as at 150 and that the cable 144 proceeds as best seen in FIGURE 3 about the sheave 151 which is mounted on an arm 152 supported from a side 153 of the box section support member 22 and the cable extends upwardly and connects at its upper end 154 as at 155 to one end 156 of a lever 157 which is in the nature of a bell crank having its elbow 158 pivoted on a fore and aft extending generally horizontal shaft 159 which is mounted on the upper ends by and between a pair of standards 160 and 161 (FIGURE 2) which are respectively secured to the top side of the member 22 and project upwardly therefrom in fore and aft spaced relationship. The lever 157 has an arm 162 which is considerably longer than the arm 156 and at its outer end mounts as at 163 the upper end of a tension spring 164, the tension spring extending diagonally downwardly and inwardly and at its lower end being anchored by means of an eye bolt 165 to a bracket 166 which suitably fastens to the adjacent side of the box section beam member 22.

The arm 156 is pivotally connected intermediate its ends as by a pin 168 to the upper end of a ram 169 which operates within the cylinder 170, the cylinder being suitably fastened at its lower end as by a pin 171 to the ears 172 mounted on the top wall 173 of the box section main frame member 22.

Similarly the cable 143 extends about the sheave 175 which is mounted on the bracket 176 from the adjacent side of the main beam member 22, the cable proceeding upwardly and at its upper end being pivotally connected as at 176 to the outer end of a short lever arm 177, said short lever arm being part of a bell crank lever member 178 which is pivoted intermediate its ends on the shaft 159, the member 178 having a long lever arm 179 which connects at its eye 180 with the upper end of a tension spring 181, the tension spring being connected by an adjustable eye bolt structure 182 to a bracket 183 which is mounted on the adjacent side of the member 22.

The lever 178 is actuated by a ram comprising a piston having its stem 184 pivotally connected as at 185 by a pin to the lever arm 177 intermediate its ends, the piston assembly 184 operating within a cylinder 187 which is pivotally connected as at 188 to the upper wall member 173 of the main frame 22 by means of ears 189 mounted on said upper wall.

Referring now to FIGURES 2 and 3, it will be noted that the top forward sides of the respective reciprocating pitmans 98 and 103 are provided with fishplates 190 and 191 which provide outwardly directed teeth for continuously sloughing off hay and the like which tends to accumulate on the pitmans. In addition to the fishplates there is provided a hollow divider structure 200 which shields the forward end 201 of the driving mechanism, as best seen in FIGURE 1, said divider being provided with a yoke structure 202 which is pivotally supported on a substantially vertical pin 203 from a slot in a forwardly overhanging trap 205 which is suitably connected to the forward end of the beam member 22 and extending forwardly thereof. It will be seen that the side walls 207 and 208 of the divider structure 200 are provided with rearwardly extending whiskers or deflectors 210 and 211 which aid in parting the grasses. It will be understood that since the strap member 205 is resilient that the shoe structure 214 at the forward tip end 215 of the divider may ride upon uneven terrain with attendant limited vertical displacement of the divider 200.

It will be understood that actuation of either ram unit raises the appropriate mower section 55 or 56 to clear obstructions and the like and that the novel arrangement herein provided removes the bulkiness of the operating mechanism from adjacent to the ground and permits the folding of the two mower bars to substantially upright transport position within the width of the tractor.

What is claimed is:

1. In a mower, the combination of an ambulatory structure, a support pivoted thereon on a substantially vertical axis, a cutting mechanism extending outwardly from each side of the support, means mounting each cutting mechanism about a common generally horizontal fore and aft axis for swinging movement between a lowered operating position and an elevated transport position, and cooperative releasable detent means on the structure and support operative to hold said mower with said cutting mechanisms substantially perpendicular to the direction of movement, said mower swingable about said vertical axis upon either of said cutting mechanisms striking an obstruction.

2. The invention according to claim 1, and operating means for each mower including a lever pivoted on the support on a generally horizontal fore and aft axis a substantial distance above the axis of pivot of the mowers, a balancing spring connected between the support and one end of the lever, lifting linkage connected between the other end of the lever and the associated mower, and ram means connected between each lever and the support.

3. The invention according to claim 1 and said levers each having a longer and a shorter arm and the longer arm of one lever extends to one side of the support and the longer arm of the other lever extends to the opposite side of the support, and said rams and springs extending generally vertically.

References Cited in the file of this patent

UNITED STATES PATENTS

| | | |
|---|---|---|
| 1,528,553 | Kennedy et al. | Mar. 3, 1925 |
| 1,750,033 | White | Mar. 11, 1930 |
| 2,277,844 | Clapper | Mar. 31, 1942 |
| 2,580,265 | Abgarian | Dec. 25, 1951 |
| 2,603,052 | Pelham | July 15, 1952 |
| 2,741,889 | Elfes | Apr. 17, 1956 |
| 2,757,504 | Elfes et al. | Aug. 7, 1956 |
| 2,830,422 | Morkoski et al. | Apr. 15, 1958 |
| 2,917,889 | Vutz | Dec. 22, 1959 |